United States Patent [19]

Oehlschlaeger et al.

[11] Patent Number: 4,653,541
[45] Date of Patent: Mar. 31, 1987

[54] DUAL WALL SAFETY TUBE

[75] Inventors: Richard M. Oehlschlaeger, Novelty; John R. Greco, Ravenna, both of Ohio

[73] Assignee: Parker Hannifin Corporation, Cleveland, Ohio

[21] Appl. No.: 749,075

[22] Filed: Jun. 26, 1985

[51] Int. Cl.[4] ............................................. F16L 9/18
[52] U.S. Cl. .................................. 138/104; 138/111; 138/148
[58] Field of Search ............... 138/111, 114, 104, 149, 138/112, 113, 148

[56] References Cited

U.S. PATENT DOCUMENTS

| | | | |
|---|---|---|---|
| 3,410,313 | 11/1968 | Martin | 138/148 |
| 3,717,718 | 2/1973 | Schmidtchen | 138/114 |
| 3,802,491 | 4/1974 | Plank, Jr. et al. | 138/111 |
| 3,866,670 | 2/1975 | Cramer | 138/111 |
| 4,194,536 | 3/1980 | Stine et al. | 138/149 |
| 4,315,408 | 2/1982 | Karl | 138/112 |

Primary Examiner—Stephen Marcus
Assistant Examiner—Leo J. Peters
Attorney, Agent, or Firm—Joseph B. Balazs

[57] ABSTRACT

A dual wall safety tube assembly comprises an inner, seamless, stainless steel tube of extended length and an outer, welded stainless steel tube of the same length, in which the inner tube is connected as a process line without any junctions except for end couplings and the outer tube is similarly connected as a monitoring or inerting conduit. The assembly may include further options of electric heating cable, plastic jacketing and thermal insulation of fiberglass or similar material.

4 Claims, 9 Drawing Figures

DUAL WALL SAFETY TUBE

BACKGROUND OF THE INVENTION

This invention relates to conduits for transmitting hazardous fluids and more particularly to long length transmission conduit which includes a surrounding conduit for safety purposes.

Dual conduit apparatus has been utilized in the past for various purposes including the transmission of hazardous gases and the like. Typically, the inner conduit is arranged to transport the hazardous fluid while the outer conduit provides a backup or a means to monitor the integrity of the primary line or even as a device for counteracting primary line leakage by means of inert fluids or the like. In such systems the inner conduit may be connected for transmission of fluid at a low level of pressure while the outer conduit may be connected to a higher pressure source. In the event of leakage in the inner conduit, flow then would occur from the outer to the inner conduit and the change in pressure of the outer conduit, for example, could be monitored to detect the failure.

Some hazardous fluids are extremely dangerous but may be required to be routed through a manufacturing facility for great distances in order to isolate or secure the source of fluid and yet provide the material at various locations where it is required in a manufacturing process. In the past it has been the practice to provide a redundant, tube within a tube-type system by fabricating the assembly from relatively short lengths of rigid conduit. Such conduit in small diameters may be bendable to facilitate routing through turns, but in the larger diameters of the outer conduit, this may be difficult or impractical. Some prior art installations currently employ rigid threaded pipe for the outer conduit and while this provides a primary advantage of strength and rigidity for the system, it also includes the inherent drawbacks of inflexibility, sensitivity to thermal expansion, multiple interconnecting joints, relatively large size and high cost, and difficulty of installation and maintenance. While many of these factors can be tolerated the bottom line is that the multiplicity of joints in the system create a condition which is inherently sensitive to environmental influences and very dependent upon the quality of the initial installation. In the transmission of hazardous and toxic fluids, such conditions are difficult to control even with the redundant conduit systems currently being employed in industry.

Other forms of long length tubes are known in the art which are provided for the transmission of fluids under controlled conditions, most often including thermal barriers therein. One example of this is U.S. Pat. No. 4,194,536 which describes several examples of long length tubing products of various configurations, including single and plural side-by-side tubes, with or without heating cable or heat tubes and combined in a jacketed structure with thermal insulation. Such product is bendable and deformable for facility of routing but does not comprehend the tube within a tube structure of the instant invention.

Other prior art structures are described in U.S. Pat. Nos. 4,240,850 and 4,351,365. In both of these references, drawn, continuous inner tube of copper for example, is sheathed by various materials including a cover of plastic or metal strip which is longitudinally closed thereover. In both of these examples means are provided for concentrically spacing the inner and outer tubes, while the space therebetween is filled with thermal insulation material for controlling the thermal characteristics of the composite structure. No free space is provided between the inner and outer tubes for an inerting fluid, for example.

One form of a rigid conduit system is disclosed in U.S. Pat. No. 3,693,648 and this is typical of cumbersome prior art structures.

SUMMARY OF THE INVENTION

The apparatus of the instant invention is an entire solution to many of the prior art problems and provides a system for transmission of fluids which is inherently safer and more reliable than prior art systems. Further, this apparatus is lighter, smaller, more flexible, less costly and easier to install and maintain. And with this combination of characteristics the system is more rugged than prior art systems, having greater shock resistance and being less subject to environmental influences, and therefore, inherently less subject to failure.

The apparatus consists essentially of a drawn stainless steel inner tube surrounded by a welded steel outer tube, both tubes being continuous between end terminations and having no junctions therebetween. The inner tube is usually arranged to transport a working fluid with the annulus between inner and outer tubes being free of structure and arranged to transport a fluid supplementary to the working fluid. Typically the latter is an inert gas contained at a pressure higher than the working fluid to act as a barrier to escape of the working fluid. Any change of the system, in the confines between the inner and outer tubes can thus be detected as by monitoring the pressure level of the fluid in the outer tube.

It is within the teachings of this invention to draw the dual tube structure through a path, including a circuitous path, between end terminations without introducing junctions in the structure and to terminate the tubes in fittings adapted for direct interconnection to source and utilization devices at either end of the tubes. The dual tube structure may further be encased in insulation and be sheathed by a continuous jacket of thermoplastic or similar material and can additionally include along its length, electric heater cable and electric signal or grounding wires. Further embodiments of the invention deploy plural dual tube structures within a common jacket to provide an assembly of minimal size which may be readily routed for plural applications.

A significant advantage of this apparatus is that cleanliness of the product can be established and assured at the time of manufacture thereof and is not dependent upon installation techniques. This is significant when the many differing applications for the product are considered and is extremely important when certain hazardous fluids are to be transported in the system.

DETAILED DESCRIPTION OF THE INVENTION

Figure 3:
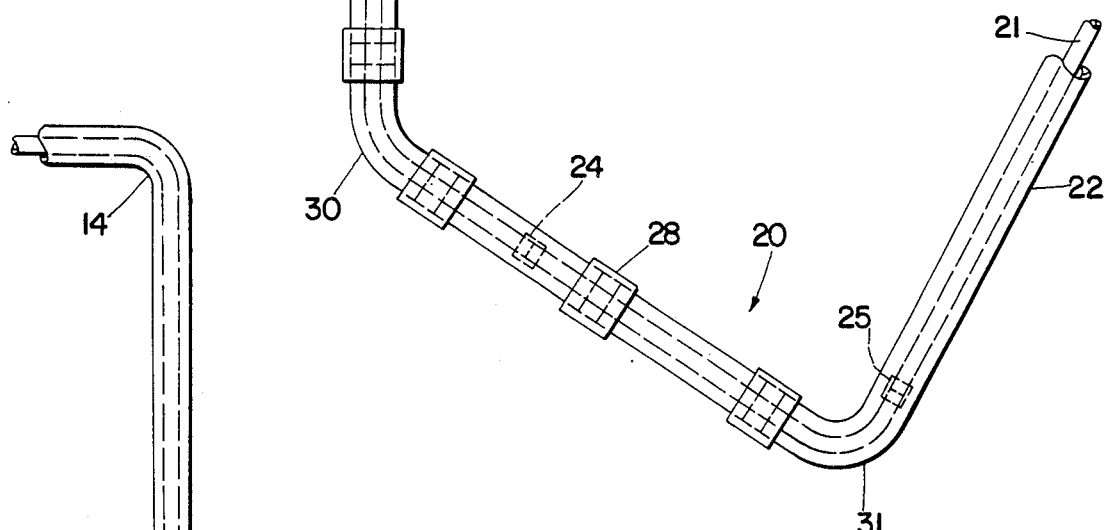
FIG. 3 is a plan view of a portion of the dual tube apparatus of the instant invention.

Referring initially to FIG. 3 of the drawings, the dual tube 10 of the invention is shown in partial plan view as comprising inner tube 11 and outer tube 12 in a typical installed configuration including several bends in the structure as at 14, 15 and 16. While the dual tube 10 shown is only a partial structure, it provides an indication that the assembly of tubes 11, 12 can be routed in practically any configuration to deliver fluid from one end to the other and that the route can be accommodated in practically any manner by bending the dual tube 10 as required, without the necessity for introducing joints or junctions throughout the length of the structure. In utilization in a typical processing plant for example, the length of the dual tube may be on the order of a thousand feet or so, and the fact that there are no junctions throughout the length of the assembly is significant in establishing and maintaining the integrity and safety of the apparatus.

Figure 1:
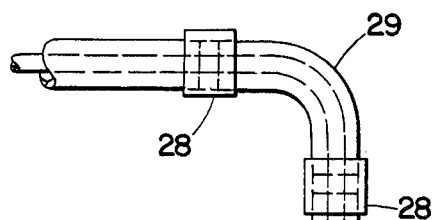
FIG. 1 is a plan view of a portion of a prior art conduit system comprising inner and outer conduits.
Figure 2:
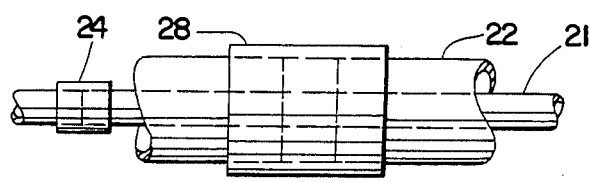
FIG. 2 is an enlarged view of a part of the prior art conduit system of FIG. 1.

FIGS. 1 and 2 represent prior art configurations of dual tube structure which has been utilized to achieve the routing of hazardous gases and the like throughout processing operations. These prior art structures include a dual conduit 20 comprising inner conduit 21 and outer conduit 22, again in a long length assembly typically on the order of many hundreds of feet. Such prior art conduits 21, 22 are made up of relatively short lengths of rigid conduit which are either threaded together to achieve the long lengths desired or otherwise welded or joined in a similar manner.

In one prior art example the semiconductor manufacturing industry uses highly toxic and hazardous gases in the manufacturing of semiconductors. The piping method used to transfer these gases from the gas supply cabinet to the manufacturing equipment is with straight length one-fourth inch seamless tubing as the inner conduit 21 which is placed within the I.D. of one inch or one and one-half inch schedule 40 pipe as the outer conduit 22. This method has many limitations and generates many conditions which limit the degree of safety in the finished form and demands high material and labor costs to control the quality of the assembly. The inner conduit 21 is commercially available in 17-24 foot or 28-32 foot random straight lengths which, for longer lengths requires either tube couplings, welded fittings or that the tubes be orbitally welded together. These junctions are shown schematically at 24, 25 in FIG. 1. Each method of coupling the inner conduit 21 has inherent potential for leaks.

The use of any fitting as at 24, 25 on the inner conduit 21 dictates the I.D. of the outer conduit 22 with the requirement that the latter must be oversized for its intended purpose, thereby creating higher costs than actually required to perform the required function. Outer conduit 22 is typically also available in 17-24 foot or 28-32 foot lengths and requires couplings or weldments for joining the lengths together which are also potential leak producers. All changes in direction of the conduit must be done with fittings or with the outer conduit 22 bent to required dimensions with the inner conduit 21 already inside.

In the example given in FIGS. 1 and 2 the inner conduit 21 is one-quarter inch stainless steel tubing coupled at junctions 24, 25 by means of welded flanges, thereby requiring a one and a half inch I.D. outer conduit 22, which in this instance is rigid threaded pipe, joined by couplings 28 as indicated. Standard threaded pipe is available in predetermined lengths and predetermined configurations such as elbows 29, 30 or may be bent in some instances as in street elbow 31. However, it will be apparent that since the sections must be threaded into the couplings 28, only a short length of the inner conduit 21 may be prepositioned therein and accommodate the necessary twisting movement of the outer conduit 22. Therefore, although all of the couplings in this dual tube system are not shown, many couplings such as 24, 25 will be required to join sections of the inner conduit 21 throughout the entire length of the assembly. It will be apparent that the many junctions throughout the system create potential leak paths for the fluid either in the inner conduit 21 or in the outer conduit 22 which jeopardize the integrity of the entire system. Further, the hand fabricated method of using commercially available components does not allow any degree of maintaining cleanliness during assembly other than that which the installers may be able to accomplish during the routing procedure, and further, such assembly system allows only a minimal degree of cleaning after installation whereby the inner conduit 21 or outer conduit 22 is flushed prior to utilization of the assembly. It will be apparent that the dual tube 10 of the instant invention as shown in FIG. 3, being a prefabricated quarter inch seamless tube inside a one-half inch welded tube, in long lengths on the order of one thousand feet, eliminates the need for inner run fittings and thereby eliminates potential fitting leakage. Further, since there are no junctions in the outer tube 12, as well, this potential for leakage is also eliminated. The dual tube 10 is typically fabricated with circular cross section thin wall tubing, and therefore, is much less rigid than the solid conduit 22 of the prior art, and therefore, can be formed easier into desired routing configurations. Still further, the inner and outer tubes 11, 12 in the dual tube product 10 can be cleaned after fabrication and cleanliness maintained throughout the installation since the integrity of the assembly need not be compromised during the installation process.

Figure 4:
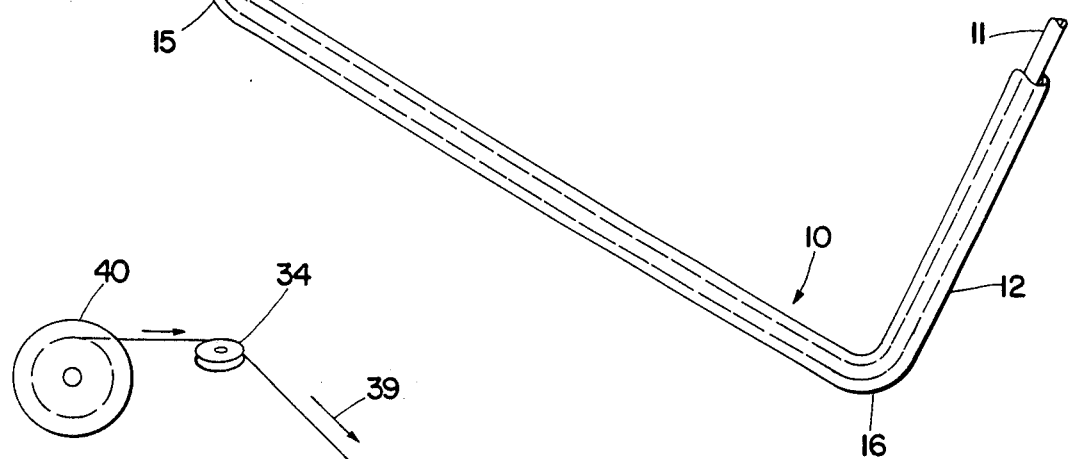
FIG. 4 is a schematic showing of sheave apparatus for drawing the dual tube apparatus of the instant invention into a predetermined configuration.
Figure 4:
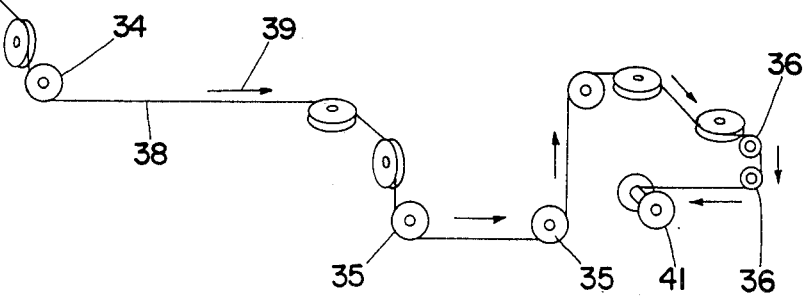

The ease of installation of the dual tube 10 of the invention is demonstrated in the schematic drawing of FIG. 4 wherein it is described how the dual tube is routed throughout a typical manufacturing facility. In this arrangement a plurality of sheaves 34 are arranged in a pattern in which it is desired to route the dual tube 10 of the invention for permanent installation in the manufacturing environment. Thus, for example, corner sheaves 35 provide approximaely a one hundred eighty degree change in direction of the route for the dual tube to clear some obstruction in a factory or to change the route for any other purpose while sheaves 36 indicate that the dual tube can readily be routed upwardly or downwardly to change the elevation thereof for convenient access between the utilization device and the supply source. Once the pattern of sheaves 34, 35, 36 have been deployed, the route for the dual tube is established as depicted by solid line 38 with the direction of pull of the dual tube indicated by arrows 39. Dual tube 10 is supplied from storage drum 40 and is drawn through the system of sheaves 34, 35, 36 by a cable drawn by winch 41, to achieve the desired route 38. In practice, due to the great length of route 38, both a leading end pulling cable and a tail end pulling cable may be attached to the dual tube and drawn through the system of sheaves. By this technique, substantially no affect is made upon the dual tube other than to bend same about the sheaves so that the cleanliness and integrity of the product is maintained. Once the dual tube is established in place, all that remains is to support the system appropriately and make end fitting connections for utilization purposes, this being considerably more convenient than with prior art systems. A still further advantage of the dual tube 10 system may be noted in that because of its flexibility, it is much less subject to damage due to shock or environmental influences, which typically could cause ruptures in the rigid, inflexible systems used in the past.

Figure 5:
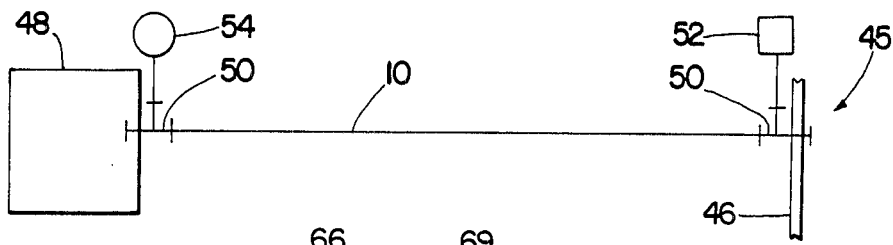
FIG. 5 is a schematic drawing of the dual tube apparatus of the instant invention in connection between source and utilization devices in a typical interconnection system.

Referring now to FIG. 5, there is shown a schematic drawing of a typical interconnection system for the dual tube apparatus of the invention in connection between source and utilization devices which are respectively gas supply cabinet 45, a portion of one wall of which is depicted at 46, and the processing equipment 48 which may be any form of utilization device. Interconnections are made at either end of dual tube 10 in termination fittings 50. The fittings 50 are bulkhead type fittings to provide transfer for the inner tube 11 through wall 46 of gas supply cabinet 45 and through a wall of the processing equipment 48. The fittings 50 are tee fittings and provide communication between the outer tube 12 and devices such as a source of nitrogen under pressure indicated at 52 and a pressure meter 54, again at respective ends of dual tube 10.

Figure 6:
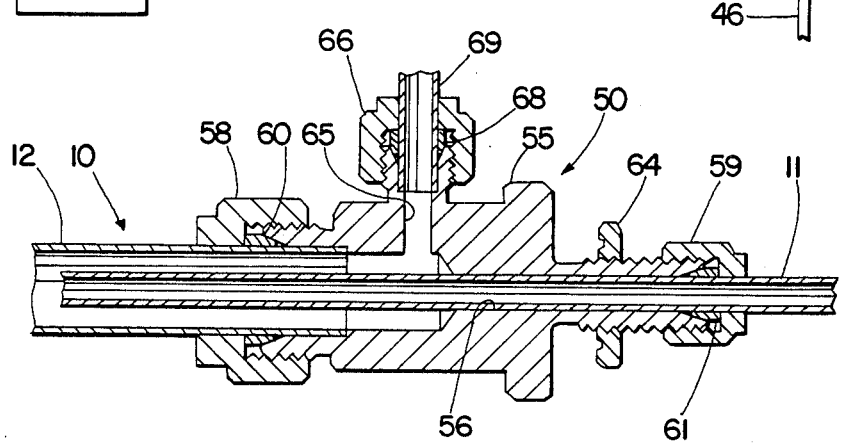
FIG. 6 is a sectional view of an end portion of the dual tube apparatus of the invention in connection with a termination fitting.

The termination fittings 50 are shown in greater detail in FIG. 6 as comprising body member 55 having through bore 56 and threaded at either end to receive coupling nuts 58, 59 for securing compression sleeves 60, 61 respectively. Body member 55 also receives nut 64 at one threaded end thereof for securement to a bulkhead or similar member for securing the fitting 55 in a predetermined location.

Through bore 56 is stepped and receives inner tube 11 of dual tube 10 in a small diameter portion thereof and receives outer tube 12 in a larger diameter portion thereof, each of the inner and outer tubes 11, 12 being secured respectively by compression sleeves 61, 60 and secured for fluid tight engagement by coupling nuts 59, 58 respectively.

The larger portion of through bore 56 is intersected by cross bore 65 for communication with the interior of outer tube 12. Cross bore 65 terminates at a threaded boss on body member 55 which receives coupling nut 66 and compression sleeve 68 for fluid tight securement of an inserted section of pipe 69 which is in fluid communication with either the source of nitrogen supply 52 or pressure meter 54.

Thus, it will be apparent that inner tube 11 of dual tube 10 may be directed through both termination fittings 50 for direct connection to the gas supply cabinet 45 and the processing equipment 48 with no junctions in the system therebetween and may supply a working fluid, whether it be a hazardous gas or the like directly between the locations in a highly secure manner. Although the route between gas supply cabinet 45 and utilization device 48 is depicted as a straight line in FIG. 5, it will be understood that this route may be circuitous as well as depicted in FIGS. 3 and 4, and that inner tube 11 will still be continuous in these configurations.

Similarly, outer tube 12 is continuous between termination fittings 50 and is secured in the fittings in a fluid tight manner for connection in this example to a source of nitrogen under pressure 52 at one termination fitting and to pressure meter 54 at the other. Meter 54 and one fitting 50 thus provides a means for closing one end of outer tube 12. The nitrogen supply 52 is typically under a higher pressure level than that of the working fluid in inner tube 11 and because of the integrity of the system, such pressure level will be maintained at a steady state reading at pressure meter 54 unless some disruption occurs in the system. In this event, for example, if there is a rupture in inner conduit 11 within the dual tube apparatus 10, pressure will flow from the outer conduit 12 to the inner conduit 11 and be recognized as a loss in the fluid pressure level at meter 54. Similarly, if there is a failure in outer conduit 12 whereby fluid therein escapes to the atmosphere, a similar loss of fluid pressure at meter 54 will detect the condition. It is apparent that while meter 54 is indicated as a visual indicating device, electronic or other devices may be provided to supply an automatic alarm for changes in fluid pressure.

Figure 7:
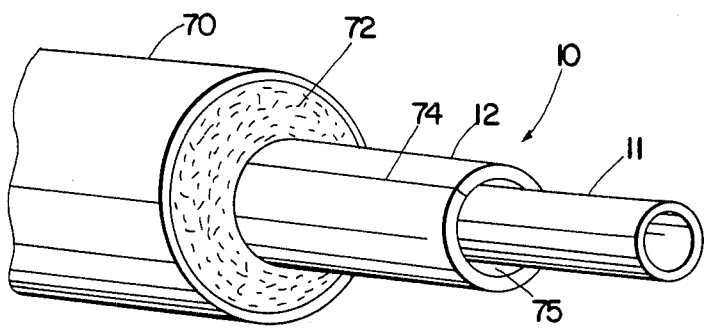
FIG. 7 is a perspective view of another embodiment of dual tube apparatus of the invention.

Referring to FIG. 7, a perspective view of another embodiment of dual tube apparatus of the invention is shown as comprising inner tube 11, outer tube 12 surrounded by insulation material 72 and further encased in plastic jacket 70. As noted, inner tube 11 is a drawn, seamless, continuous, stainless steel, flexible tube of relatively small dimensions and of extended length. Outer tube 12 is a slightly larger tube also of continuous length, this however, being formed over inner tube 11 in a continuous fabrication process. Outer tube 12 includes longitudinal seam 74 which has been welded closed in one of many processes known in the art and forms an annulus 75 with inner tube 11 for flow of inerting fluid or the like as previously indicated. Outer tube 12 is thin wall conduit and together with inner tube 11 may be readily formed and bent in an appropriate routing path. Should it be a requirement of the system that the dual tube 10 of the invention be insulated or further protected, the insulation materials 72 and jacket 70 can be applied thereover by well known fabrication techniques. These would include, for example, the winding of fiberglass or jute mats about the dual tube 10 in a process line until the desired thickness of insulation material 72 is attained followed by the extrusion of plastic jacket 70 thereover, the latter typically being thermoplastic material such as polyvinyl chloride. In this embodiment of the invention, inner tube 11 is one-quarter inch tubing, outer tube 12 is one-half inch tubing, insulation material 72 is wound to a depth of about one-half inch and the thickness of jacket 70 is on the order of one-sixteenth to one-eighth inch so that the diameter of the composite structure is on the order of a little less than two inches. In installation the jacket 70 and insulation material 72 may be readily separated from the dual tube assembly 10 and may be brought, for example, to the edge of the coupling nut 58 as depicted in FIG. 6 so that substantially the entire length of the assembly outside the termination fittings 50 are so covered.

Figure 8:
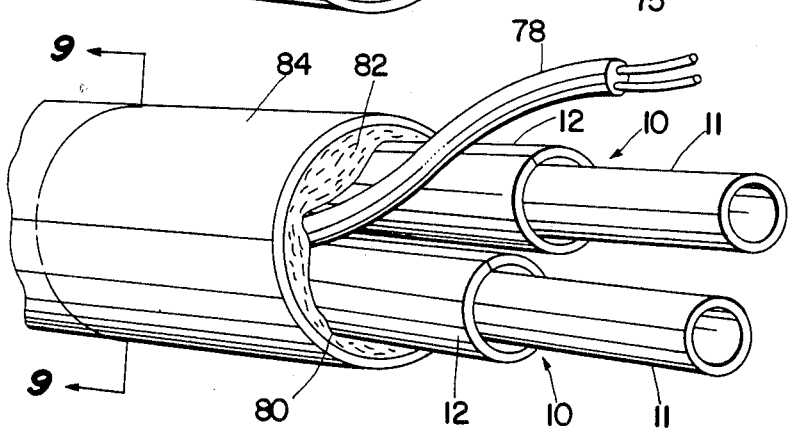
FIG. 8 is a perspective view of a further embodiment of dual tube apparatus of the invention.
Figure 9:
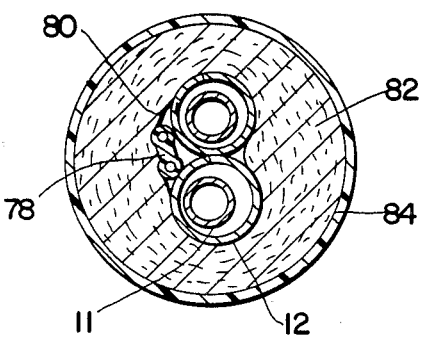
FIG. 9 is a sectional view taken along the line 9—9 of FIG. 8.

Yet another embodiment of the invention is depicted in perspective view in FIG. 8 wherein a pair of dual tubes 10 are arranged in side-by-side disposition, each comprising inner tube 11 and outer tube 12 fabricated in the manner previously described. In this embodiment a thermal heating cable 78 is spirally wrapped about the dual tubes 10 to provide control over the temperature of the entire assembly in a manner well known in the art. The dual tubes 10 and heating cable 78 typically are further wrapped with a layer 80 which is a mylar-aluminum thermal transfer aid and moisture barrier and further enclosed in insulation material 82 and plastic jacket 84 in a manner similar to that previously described with respect to FIG. 7. A cross section of this embodiment of the invention is shown in FIG. 9 wherein it is apparent that the dual tubes 10 of the invention are not necessarily concentric tubes but may be arranged in substantially any desired configuration with respect to one another. In fact, there is no support between inner tube 11 and outer tube 12 such that the flow of fluid in the annulus 75 therebetween is unimpeded and the tubes are free to attain their respective positions dependent upon the positioning of the dual tube apparatus 10, the effect of gravity or of bends thereupon and similar environmental influences. One of these influences is the concentric arrangement of bores 56 in the termination end fittings 50. However, this is provided primarily as a convenience for manufacturing purposes and does not otherwise affect the operation of the system.

We claim:

1. A conduit assembly for the transfer of fluid between a source and a remote utilization device, comprising
   a first continuous, long length, bendable, seamless metal tube formed of stainless steel,
   a second continuous, long length, bendable, seam welded metal tube surrounding said first tube and forming a generally annular space therebetween,
   said first tube being a small diameter thin wall tube devoid of structure within the confines of its inner periphery and adapted for transferring fluids,
   said second tube being a thin wall tube slightly larger in diameter than said first tube and devoid of structure within the confines of its inner periphery except for said first tube, said second tube being closely spaced from said first tube and adapted for transferring fluid within said annular space, said first and second tubes being prefabricated relative to one another and extending between said source and said utilization device with no junctions therebetween, and
   means connecting said first and second tubes to first and second sources of fluids respectively, said connecting means comprising fittings at both ends of said first and second tubes, each said fitting having a stepped bore therein for receipt of said first and second tubes, said second tube being sealingly received in the larger portion of said stepped bore.

2. A conduit assembly as set forth in claim 1 further comprising means in fluid connection with said larger portion of said stepped bore for monitoring the fluid pressure in said second tube, said first tube extending through both said fittings for direct connection respectively to said source and said utilization device.

3. A conduit assembly as set forth in claim 2 wherein said outer tube is one-half inch in diameter and said monitoring means comprises a fluid pressure meter.

4. A conduit assembly as set forth in claim 1 wherein each said fitting is a bulkhead fitting adapted for connection to a structural wall member, said fitting adapted to sealingly receive said first tube in the smaller portion of said stepped bore and for supporting said first tube in said wall member.

* * * * *